United States Patent
Schechtman et al.

(10) Patent No.: US 7,421,410 B1
(45) Date of Patent: Sep. 2, 2008

(54) METHOD AND SYSTEM FOR PROVIDING AN INCENTIVE TO USE AN AUTOMATED TELLER MACHINE (ATM)

(75) Inventors: Howard A. Schechtman, Agoura Hills, CA (US); Peter Paradiso, Santa Monica, CA (US)

(73) Assignee: Citicorp Development Center, Inc., Cincinnati, OH (US)

( * ) Notice: Subject to any disclaimer, the term of this patent is extended or adjusted under 35 U.S.C. 154(b) by 1115 days.

(21) Appl. No.: 09/684,096

(22) Filed: Oct. 6, 2000

(51) Int. Cl.
*G06Q 40/00* (2006.01)
(52) U.S. Cl. .............................. 705/43; 705/35; 705/41
(58) Field of Classification Search ................. 705/35, 705/39, 41, 43, 44, 38, 40
See application file for complete search history.

(56) References Cited

U.S. PATENT DOCUMENTS

| | | | |
|---|---|---|---|
| 5,734,838 A | 3/1998 | Robinson et al. | 395/214 |
| 5,781,894 A | 7/1998 | Petrecca et al. | 705/14 |
| 6,009,415 A | 12/1999 | Shurling et al. | 705/35 |
| 6,026,382 A * | 2/2000 | Kalthoff | 705/35 |
| 6,260,758 B1 * | 7/2001 | Blumberg | 235/379 |
| 2002/0032656 A1 * | 3/2002 | Chen | |
| 2002/0065712 A1 * | 5/2002 | Kawan | |

FOREIGN PATENT DOCUMENTS

EP 0661667 A2 * 12/1994

OTHER PUBLICATIONS

U.S. Appl. No. 60/193,800, filed Mar. 31, 2000.*
U.S. Appl. No. 60/073,093, filed Jan. 30, 1998.*
"IBAA Launches Searchable List of Surcharge-Free ATMs to Help Consumers Reduce Fees". PR Newswire. New York: Sep. 15, 1998, p. 1.*
"IBAA Launches Searchable List of Surcharge-Free ATMs to Help Consumers Reduce Fees". PR Newswire. New York: Sep. 15, 1998, p. 1.*
Francis Clare. "Stay One Step Ahead of Your Bank to Minimize Charges Clare Francis Reports on How to Escape the Worst Ravages of Fees and Penalties". The Independent: London (UK): Jul. 2, 2000. p. 14.*
"Let Banks, Not Government, Decide Policies on ATM Fees". American Banker. New York, NY: Dec.21, 1999. vol.164, Issue 243; p.7.*
"Special Feature: Bank Products and Innovations (Essentials for Tough Times): Cash Prizes for Lucky Express . . ". Business World. Manila: Feb. 22, 1999. p.1.*
McKeveny, Alexander, "Giving Them A Good Reason," *Banking Marketing*, vol. 29, No. 3, pp. 37-40, Mar., 1997.

(Continued)

*Primary Examiner*—Lalita M Hamilton
(74) *Attorney, Agent, or Firm*—George T. Marcou; King & Spalding LLP

(57) ABSTRACT

The present invention provides methods and systems for promoting banking services to non-customers at an automated teller machine (ATM) through an incentive system. Non-customers who enroll in the incentive system are awarded points based on ATM use, viewing of advertisements at an ATM, and other factors. When a pre-determined number of points is accumulated by the non-customer, the non-customer is provided with an award (e.g., a convenience fee for use of the ATM is forgiven). In addition, use of networked ATMs by the non-customer is tracked in order to provide tailored awards and advertisements.

68 Claims, 2 Drawing Sheets

OTHER PUBLICATIONS

"Financial Exchange Scoopstakes," *Financial General Bankshares, Inc., Washington, DC, Golden Coin*, p. 30, 1982.

Anonymous, "New Tactics to Drice Up Debit Card Activity," *Bank Network News*, vol. 4, No. 22, pp. 3, 5, 8, Apr. 10, 1986.

Sulon, Bill, "Pennsylvania State Bank to Give Away Money to ATM Customers, Waive Fees," *Knight-Ridder Tribune Business News*, Apr. 18, 2000.

"CompuBank Offers ATM Fee Refunds (CompuBank Begins Offering Up to Four ATM Refnds Per Mounth to Customers in Effort to Gain More Clientele)," *Financial Banker*, vol. IV, No. 10, p. 5, Mar. 8, 1999.

Colletti, Deborah L., "Wanted: Smart ATMs, Smart Marketing," *American Banker*, vol. 155, No. 233, p. 12A, Dec. 3, 1990.

"Sanwa Bank California Renews Commitment Not to Levy ATN Surcharge on Noncustomers," *Business Wire*, p. 107, Sep. 28, 1998.

"Sanwa Bank Reaffirms Year-Old Commitment Not to Levy ATM Surcharge on Noncustomers," *Business Wire*, p. 5051026, May 5, 1998.

\* cited by examiner

METHOD AND SYSTEM FOR PROVIDING AN INCENTIVE TO USE AN AUTOMATED TELLER MACHINE (ATM)

I. CROSS REFERENCE TO RELATED APPLICATION

This patent application claims priority to U.S. Provisional Patent Application Ser. No. 60/158,113, entitled "Method and System for Providing an Incentive to Use an Automated Teller Machine (Global ATM Strategy)," filed Oct. 7, 1999 now abandoned, which is hereby incorporated in full by reference.

II. FIELD OF THE INVENTION

The present invention relates generally to the field of automatic teller machines (ATMs). More particularly, the present invention relates to a method and system for providing an incentive for a user, such as a non-customer, to use an ATM.

III. BACKGROUND OF THE INVENTION

Conventionally, a financial institution (e.g., a bank) that operates automatic teller machines (ATMs) allows persons who are not customers of the institution (hereinafter "non-customers" or "off-us customers") to use the institution's ATMs. A financial institution that allows non-customers to use its ATMs conventionally charges non-customers a usage (or convenience) or other fee each time the non-customer uses an ATM of the institution. Such usage and other fees provide revenue for the institution. The amount of revenue is directly impacted by the number of ATM uses by non-customers. Moreover, non-customers will sometimes become customers of the institution, and an ATM transaction by a non-customer presents an opportunity to provide a favorable impression to a non-customer and to market the institution's services. Multiple opportunities to influence a non-customer to become a customer is desirable. Thus, it is desirable for a financial institution to develop a strategy to encourage non-customers to continue or increase use of the institution's ATMs and to engender loyalty among non-customers to the institution.

With conventional systems and methods, the communications presented to non-customers may leave the non-customer with the impression that the non-customer is not welcome. For example, conventionally, a non-customer's transaction may comprise only the prompting and receipt of the usual information (PIN number, transaction desired, and an amount) plus a statement that the non-customer is to be charged a service fee.

Conventional methods and systems do not provide effective means to carry out a strategy to encourage non-customers to continue or increase use of the institution's ATMs and to engender loyalty among non-customers to the institution. Further, conventional methods and systems do not provide effective mechanisms for maintaining a record of non-customers' use of a financial institution's ATMs for use in providing targeted messages or loyalty programs to non-customers on subsequent visits to the financial institution's ATMs.

IV. SUMMARY

The present invention comprises methods and systems for providing an incentive to use an automated teller machine (ATM), such as an ATM operated by a bank. In one embodiment, a method of promoting banking services is provided comprising receiving at an automatic teller machine (ATM) a transaction request from an ATM user (e.g., the insertion of the user's bank card), determining that the ATM user is not a customer of the bank (i.e., is a non-customer of the bank), displaying information related to an incentive program on a display screen of the ATM. The information prompts the ATM user for an enrollment response. The ATM receives the response from the ATM user, and enrolls the ATM user in the incentive program. The information related to the incentive program for non-customer describes the program and encourages the ATM user to join the program.

The incentive program includes a point accumulation and award system. When the ATM user carries out various transactions at the ATM, points are awarded to the ATM user. The point balance is recorded in a database and is indexed in association with the user's BIN. When the ATM user accumulates a pre-defined number of points, or another pre-defined event occurs, the ATM user is awarded an award (e.g., a convenience fee is forgiven).

In embodiments, the transactions of the ATM user are tracked and used to select advertisements and incentives to provide to the ATM user. The ATM communicates with an ATM server system via a network, and the ATM server system stores the various data collected in relation to the user, and manages and stores points associated with the ATM user and other aspects of the system.

The ATM user may request to see the user's point balance at the ATM. The ATM accesses the user's account in the ATM server system and displays the number of points in the user's account.

In an embodiment, the ATM user supplies the user's e-mail address and telephone number when enrolling, and the bank uses the e-mail address and/or the telephone number supplied to contact the user and to market the bank's services and products. In a further embodiment, the ATM user may elect to view an advertisement in exchange for further points. Moreover, the advertisement shown to the user may be based on the user's previous transactions at the ATM (as stored in a database, such as a database maintained by an ATM server to which the ATM is connected via a network) and at other ATM's associated with the bank.

Embodiments of the present invention offer various features and advantages. It is a feature and advantage of the present invention to provide a method and system of furnishing an incentive for use of a financial institution's ATMs which causes repeat visits, for example, by non-customers (or off-us customers) to the financial institution's ATMs. It is another feature and advantage of the present invention to provide a method and system of furnishing an incentive for use of a financial institution's ATMs which encourages prospects that are non-customers to continue to use or to increase their usage of the financial institution's ATMs.

It is a further feature and advantage of the present invention to provide a method and system of furnishing an incentive for use of a financial institution's ATMs which generates revenue for the financial institution from convenience fees by encouraging more frequent use by non-customers. It is an additional feature and advantage of the present invention to provide a method and system of furnishing an incentive for use of a financial institution's ATMs that offers the financial institution opportunities to convert or encourage non-customers to become customers of the financial institution.

It is an additional feature and advantage of the present invention to enable a financial institution, such as a bank, an opportunity to differentiate its ATMs by offering a special and targeted promotion or award for a prospect or non-customer of the financial institution.

Additional objects, advantages and novel features of the invention will be set forth in the description which follows,

V. BRIEF DESCRIPTION OF DRAWINGS

VI. DETAILED DESCRIPTION

Embodiments of the present invention include methods and systems for promoting banking services. One such embodiment comprises a method and system for promoting loyalty to a financial institution and its services by non-customers through automatic teller machines (ATMs), such as those located at convenience stores, grocery stores, shopping malls, and other locations.

Figure 1:
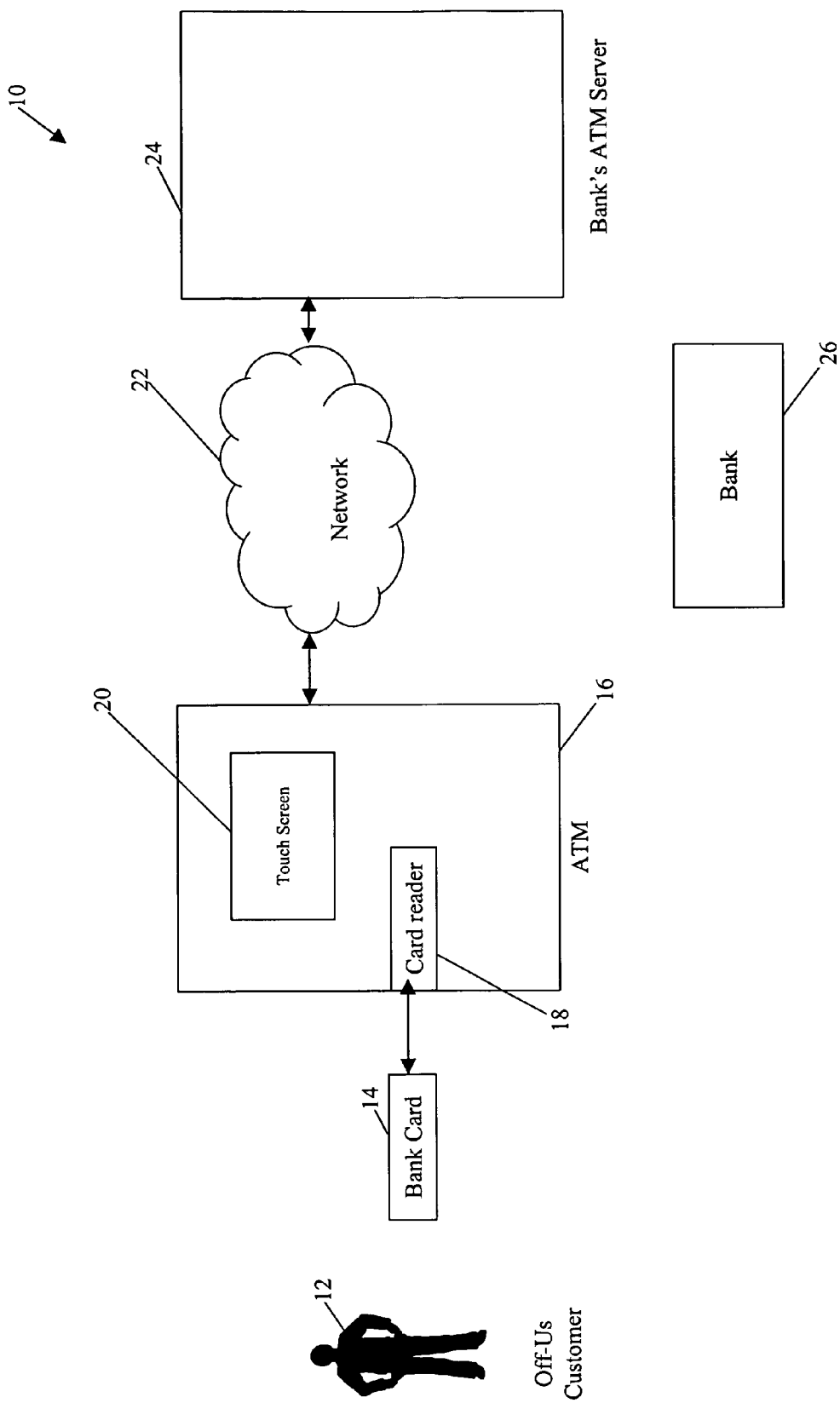
FIG. 1 shows a block diagram of an embodiment of a system according to the present invention.

FIG. 1 shows a system according to the present invention. Referring to FIG. 1, the system includes an ATM 16 operated by a financial institution 26 (in the embodiment shown, a bank). The ATM 16 includes a touch screen 20 for displaying information to a user of the ATM 16 and to receive input from the user. In other embodiments, the ATM 16 includes a display screen and a keyboard for receipt of input from the user. The ATM 16 also includes a card reader 18 for receiving and reading data from ATM cards, credit cards, and other types of cards. The ATM 16 is connected to a network 22 that allows the ATM 16 to communicate with the financial institution's ATM server 24. Communication between the ATM 16 and the ATM server 24 is carried out via the network 22, which is operated by the financial institution 26, though other communication means may be used. The server 24 includes processors and memory means (e.g., random access memory and hard-disk drive) for carrying out the functions of the server 24. Multiple ATMs operated by the financial institution 26 at various geographic locations (not shown) are connected to the network 22.

FIG. 1 also shows an individual 12 (or ATM user) and the individual's bank card 14. The individual 12 shown is an off-us customer or non-customer (i.e., an individual who is not a customer of the financial institution 26 operating the ATM 16). The individual's bank card 14 includes a bank identification number (BIN) that is unique and identifies the individual 12 and the card reader 18 is capable of reading the BIN.

Figure 2:
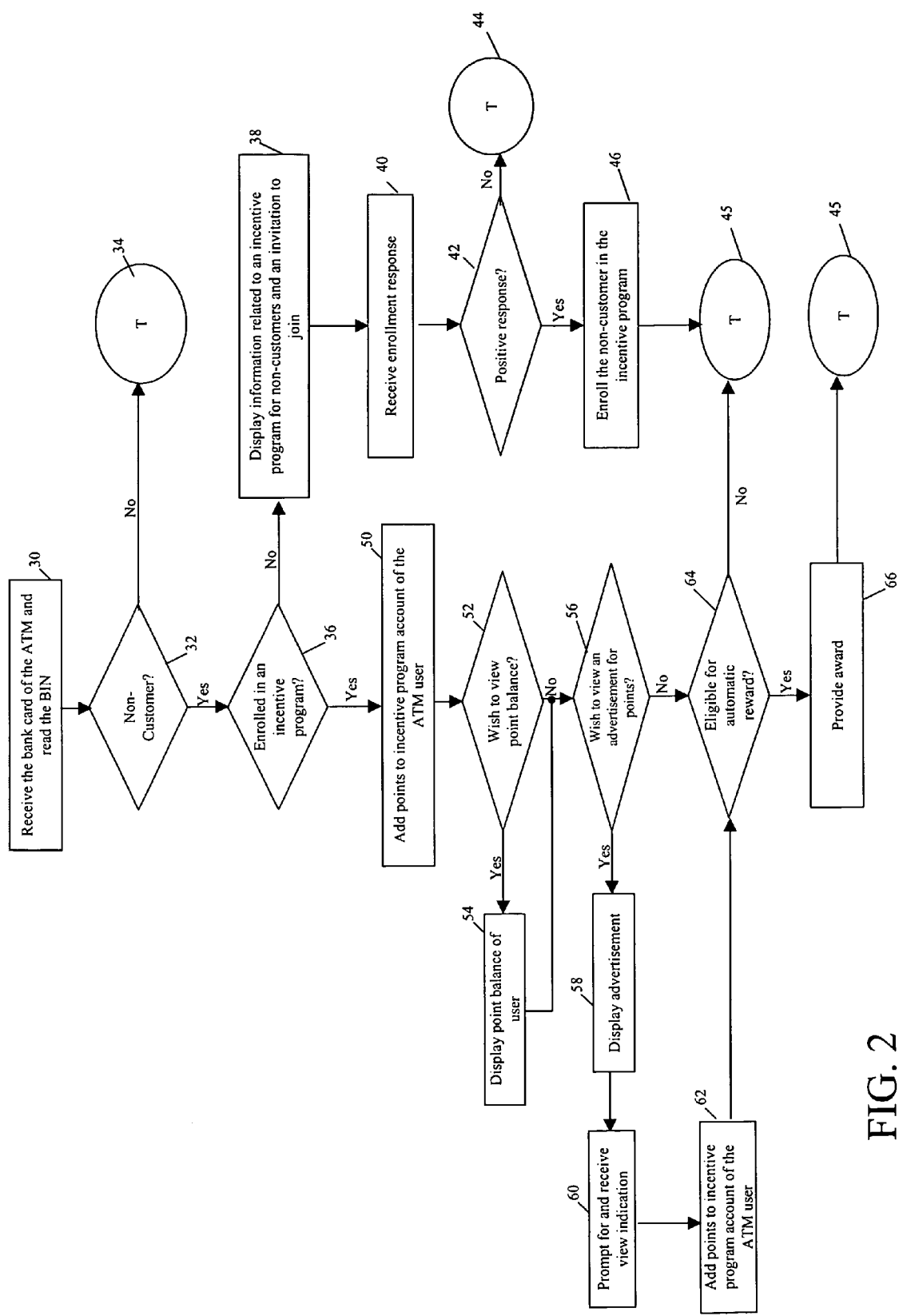
FIG. 2 shows a flow diagram of an embodiment of a method according to the present invention carried out in the system of FIG. 1.

FIG. 2 shows a flow diagram depicting an embodiment of a method of promoting banking services carried out in the system shown in FIG. 1. The process begins when the off-us customer or non-customer 12 inserts his or her bank card 14 into the card reader 18 of the ATM 16. Referring to FIG. 2 (with reference to the system items in FIG. 1 as well), the ATM 16 receives the transaction request in the form of the card insertion from the user 30. The transaction request comprises the bank identification number (BIN) from the bank card 14. In the embodiment shown, the transaction request also includes receipt of the non-customer's personal identification number (PIN) or password to confirm identification and validity.

The ATM 16 then determines whether the user of the ATM is a customer or non-customer 32. In the embodiment shown, the ATM 16 examines the BIN associated with the card 14 and compares the BIN with a database of BINs of customers located in the bank's ATM server 24 (in other embodiments, the database is located in the ATM 16). If the BIN is that of a customer, the ATM 16 determines that the user is a customer and continues with a transaction process used for the financial institution's customers 34. If the BIN is not that of a customer, the ATM 16 determines that the user is a non-customer, and then determines if the non-customer is enrolled in a loyalty program offered by the institution 36 by accessing a database of BINs of those already enrolled in the bank's ATM server 24 and comparing the BIN received from the bank card 14 with the database.

If the ATM 16 determines that the non-customer is not enrolled, the ATM 16 displays information related to an incentive (or loyalty) program for non-customers on the display screen 20 of the ATM 38. The information displayed describes the incentive program, encourages the non-customer to join the program, and prompts the non-customer for a response by asking whether or not the non-customer wishes to join and, if so, for the non-customer's e-mail address and telephone number. The non-customer may respond by using the touch screen to indicate (yes or no) whether the non-customer wishes to enroll and by typing in the non-customer's e-mail address and telephone number. In other embodiments, only one of the e-mail address or telephone number is requested. In still other embodiments, neither is requested.

The non-customer 12 provides a response to the ATM 16 via the touch screen 20, and the ATM 16 receives the response 40. The ATM then examines the enrollment inquiry response 42. If the response indicates that the non-customer does not wish to enroll, the ATM 16 proceeds with a conventional transaction process used with non-customers 44 (e.g., withdrawal or account balance inquiry). If the response indicates that the non-customer wishes to enroll, the ATM 16 enrolls the non-customer 12 in the incentive (or loyalty) program. In the embodiment shown, the ATM 16 enrolls the non-customer 12 by recording the BIN, e-mail address, and telephone number of the non-customer in a database in the bank's ATM server 24 which indicates those enrolled in the bank's incentive program. The ATM 16 then provides the non-customer 12 with a transaction process to allow the non-customer to carry out the transaction desired by the customer (e.g., withdrawal or account balance inquiry) 45. The non-customer 12 continues and completes the desired transaction with the ATM 16.

In embodiments, personnel associated with the bank later use the e-mail address and/or telephone number supplied by the non-customer to contact the non-customer. The contact may include more information about the incentive program, a continuation or carrying out of the enrollment process, encouragement to become a customer of the bank, to continue using ATMs of the bank, or other promotional activity.

In one embodiment, the non-customer is not enrolled immediately by the ATM when the non-customer indicates the non-customer wishes to enroll in an incentive program. Instead, the ATM receives the e-mail address and/or telephone number of the non-customer and contacts the non-customer at a later date using such information to enroll the non-customer.

Referring still to FIG. 2, for clarity in description of the present embodiment, it is convenient to refer again to the ATM's determination of whether the user 12 is enrolled in the incentive program. The next time the non-enrolled non-customer 12 visits the ATM 16, and is taken through the process of receiving information 30, determining that the user 12 is a non-customer 32, and determining whether the user is enrolled 36, the ATM 16 determines that the non-customer is enrolled in the bank's incentive program. The ATM 16 so determines by comparing the BIN received from the bank card 14 with a database of BINs of those enrolled in the program located at the bank's ATM server 24.

In the embodiment shown, the incentive program includes a feature in which an enrolled non-customer accumulates "points" for various activities, and these points are used to determine incentives given to the customer. For example, an enrolled non-customer will receive points for accessing the ATM and for viewing advertisements provided via the ATM display screen. Such points are accumulated during each visit. In the embodiment shown, the enrolled non-customer receives incentives upon accumulation of a pre-defined number of points. For example, upon accumulation of a pre-defined number of points (e.g., points accumulated for five visits to an ATM of the bank), the convenience (or usage) fee normally charged to non-customers by the bank for use of the ATM is waived for the enrolled non-customer.

Different incentive programs may be offered at different times. In addition, a financial institution may offer multiple incentive programs and a non-customer may choose to enroll in more than one.

Once the ATM 16 determines that the non-customer is enrolled in the incentive program 36, the ATM 16 adds a predetermined number of points (e.g., two points) to the incentive program account of the enrolled non-customer 12 for the non-customer's use of the ATM 50. The incentive program account is maintained in memory in the bank ATM server 24, and in the embodiment shown comprises a database that relates the BINs of enrolled non-customers and their point balance. The addition or subtraction of points is recorded in the database.

Various point systems may be used, and different point values may be assigned to different events. For example, a point value of two may be assigned to withdrawals, a point value of one to withdrawals, a point value of one to balance inquiries, and so on. Moreover, an expiration time may be placed on accumulated points.

Referring still to FIG. 2, the ATM 16 then displays an inquiry for the non-customer (i.e., the ATM user) 12 on the display screen 20 of the ATM 16 asking if the non-customer would like to view the non-customer's incentive program point balance 52. The ATM 16 receives the non-customer's response via the touch screen 20 of the ATM 16. If the non-customer responds in the affirmative by so indicating on the touch screen 20, the ATM 16 accesses the non-customer's incentive program account in the bank's ATM server 24 via the network 22 and determines the non-customer's point balance. This point balance is displayed to the non-customer on the display screen 54.

After the point balance is displayed to the non-customer on the display screen 54, or if the non-customer responds to the ATM's point-balance inquiry 52 in the negative, the ATM 16 displays an inquiry for the non-customer asking if the non-customer would like to view an advertisement and receive additional incentive points (e.g., two points) for viewing the advertisement 56. The non-customer 12 responds by indicating the non-customer's response on the touch screen 20 and the ATM 16 receives the response. If the response indicates customer wishes to view the advertisement, the ATM 16 displays an advertisement 58 on the display screen 20 to the non-customer 12. The advertisement may comprise any type of advertising. In the embodiment shown, the advertisement comprises information about the bank's programs for its customers and a special incentive for the non-customer 12 to open an account at the bank.

The ATM 16 then prompts the non-customer to provide an indication that the non-customer viewed the advertisement 60 by providing a prompting display to the non-customer on the touch screen 20. For example, the ATM 16 may ask the non-customer to touch the touch screen after viewing the advertisement, press a certain number of a key pad, answer a simple question about the advertisement, or to provide some other indication. In the embodiment shown, the ATM 16 displays on the touch screen 20 a request to the non-customer to touch the touch screen 20 after viewing the advertisement. The ATM 16 receives the viewed indication from the non-customer 60 and adds the indicated points (two) to the non-customer's incentive program account 62.

The ATM 16 then determines whether the non-customer/user 12 is eligible for an automatic award based on the non-customer's point accumulation 64. The ATM so determines by accessing the number of points in the customer's incentive program account as recorded in a database in the bank's ATM server 24. If the non-customer's account balance is a pre-defined amount eligible for an automatic incentive award, the associated award is provided to the non-customer 66. For example, in the embodiment shown, if the non-customer's account balance is a multiple of ten points (ten, twenty, thirty, . . . ), then the bank 26 will not charge the non-customer a usage fee for using the ATM on that occasion (or will refund the usage fee). Thus, the enrolled non-customer will receive a fee waiver every fifth visit (or more frequently if the non-customer views advertisements or takes other steps to accumulate points). The ATM 16 informs the customer 12 of the award by displaying information about the award on the touch screen 20.

A wide variety of awards may be provided based on point totals. For example, once a non-customer exceeds a pre-defined number of points (e.g., twenty), the non-customer may be given an opportunity to open an account with the bank with a pre-defined dollar balance (e.g., $50.00) provided by the bank. As another example, the non-customer may be offered the opportunity to purchase goods or services at significant discount once a non-customer exceeds a pre-defined number of points (e.g., twenty). The award provided may be on an exceeds basis (that is, it is offered to all those who exceed a certain number of points) or on a one-time, point-total basis (that is, an award is provided when a non-customer first obtains twenty points, but not again even if the non-customer maintains in excess of twenty points).

Other examples include making an award on a periodic basis besides point totals. For example, the enrolled non-customer may be forgiven the convenience fee on every tenth visit, every fifth visit, every other visit, or on some other basis. Also, the award provided may be on a for-points basis. For example, the non-customer may be given the opportunity to purchase goods or services at a significant discount in exchange for a pre-defined number of points (e.g., ten) from the customer's account.

Once the award has been awarded and the non-customer informed of the award 66, or if the ATM 16 determines that the non-customer is not eligible for an award on the current visit 64, the ATM 16 and the non-customer 12 continue their transaction 45 in a manner normally provided to non-customers (i.e., cash withdrawals, account balance inquiries, and other transactions). Those of ordinary skill in the art will recognize that although the various transaction proceedings 34, 44, 45 are indicated differently in the embodiment, the proceedings 34, 44, 45 may comprise the same interactions and script.

In embodiments, the ATM 16 tracks the electronic transactions of the ATM user 12 completed using the ATM 16, and records descriptions of such transactions (e.g., withdrawal, deposit, or balance inquiry) in a database in the ATM server 24 in association with the BIN of the user. In such embodiments, an algorithm may be employed by the ATM 16 or the ATM server 24 to choose specific advertising for non-customers based on their past electronic transactions using an ATM of the bank. For example, if the non-customer chooses to view an advertisement to earn points (item 56 in FIG. 2), the ATM 16 accesses the database indicating the past transactions of the non-customer, and if the non-customer has carried out a large number of withdrawals over the past two months, the ATM 16 displays an advertisement explaining that the non-customer could save money by opening an account with the bank 26. Such previous-transaction data may also be used in an embodiment to select a tailored award for the enrolled non-customer by examining the data with an algorithm to select an advertisement in which previous-transaction data indicates the non-customer would be interested.

As mentioned, multiple ATMs operated by the financial institution 26 at various geographic locations (not shown) are connected to the network 22, and are thus connected to the bank's ATM server 24. In an embodiment, such ATMs operate according to the process described above with respect to the single ATM 16. Any one of such multiple ATMs may determine that the non-customer 12 is enrolled in the bank's incentive program, and carry out such functions as described in relation to the single ATM 16 with reference to FIG. 2 above. Moreover, in embodiments, the electronic transactions of a non-customer at the many ATMs are tracked and recorded in a database in association with the non-customer's BIN as described above with respect to the single ATM 16.

In other embodiments, the ATM 16 displays on the touch screen 20 an opportunity to the non-customer 12 to redeem the non-customer's points for goods, services, discounts, credit, or cash. For example, in an embodiment, after displaying an opportunity for the non-customer to view an advertisement 56, the ATM 16 displays on the touch screen an opportunity for the non-customer to have ten points deducted from the non-customer's balance in exchange for a refund of the convenience charged to the non-customer 12 by the bank 26 or in exchange for reducing or eliminating the convenience fee of the ATM user.

Moreover, other special promotions may be shown to enrolled non-customers upon receipt of the non-customer's BIN. For example, when an enrolled non-customer places the non-customer's bank card in the card reader 18 and the ATM 16 determines that the user is an enrolled non-customer, the ATM may display a special promotion, such as a free gift, program subscription opportunity, or other opportunity.

The ATMs used in embodiments of the present invention may at any location. In an embodiment, ATMs are employed that are operated by the financial institution at off-premises locations (locations separate from the institution or its branches), such as at convenience stores, stand-alone ATMs, and shopping centers. Other embodiments employ ATMs located on the premises of the financial institution or its branches as well.

Various embodiments of the invention have been described in fulfillment of the various objects of the invention. It should be recognized that these embodiments are merely illustrative of the principles of the present invention. Numerous modifications and adaptations thereof will be apparent to those skilled in the art without departing from the spirit and scope of the present invention.

That which is claimed is:

1. A method of promoting banking services comprising:
   receiving at an automatic teller machine (ATM) a transaction request from an ATM user for a transaction for which a convenience fee is charged if the user is a non-customer, wherein the ATM comprises a display screen;
   determining that the ATM user comprises a non-customer;
   displaying information related to an incentive program for non-customers on the display screen, wherein the information prompts the ATM user for a response;
   receiving the response from the ATM user;
   enrolling the ATM user in the incentive program;
   accumulating award points in an incentive program account for the enrolled non-customer ATM user in connection with each succeeding transaction request from the enrolled non-customer ATM user; and
   discounting at least a portion of the convenience fee for the enrolled non-customer ATM user when a pre-determined award points balance is accumulated in the incentive program account.

2. The method of claim 1 further comprising tracking the electronic transactions of the ATM user.

3. The method of claim 2 wherein the ATM comprises an ATM operated by a first financial institution.

4. The method of claim 3 wherein determining that the ATM user comprises a non-customer comprises determining that the ATM user is not a customer of the first financial institution.

5. The method of claim 4 wherein determining that the ATM user comprises a non-customer comprises accessing a network associated with the first financial institution.

6. The method of claim 4 further comprising assigning a pre-selected number of points to the incentive program account of the ATM user in response to a pre-selected event.

7. The method of claim 6 further comprising receiving a point-balance request from the ATM user, accessing the account of the ATM user, wherein the account comprises a point balance of the ATM user, and providing the point balance of the ATM user to the ATM user.

8. The method of claim 7 wherein the transaction request comprises a bank identification number (BIN).

9. The method of claim 8 wherein the receiving at the automatic teller machine (ATM) the transaction request from the ATM user comprises receiving an ATM card of the ATM user.

10. The method of claim 9 wherein the information related to the incentive program for non-customers comprises information encouraging the ATM user to join the incentive program.

11. The method of claim 10 wherein the response comprises at least one of the following: an e-mail address and a telephone number.

12. The method of claim 10 further comprising thereafter tracking the ATM user's electronic transactions on a second ATM associated with the first financial institution.

13. The method of claim 12 further comprising providing the ATM user with further opportunities to earn a pre-selected number of points.

14. The method of claim 13 further comprising providing an opportunity to the ATM user to redeem the points for at least one of the following: goods, services, discounts, credit, and cash.

15. The method of claim 1 wherein discounting the convenience fee of the ATM user comprises eliminating the convenience fee of the ATM user.

16. The method of claim 15 wherein eliminating the convenience fee of the ATM user is carried out on a periodic basis.

17. The method of claim 16 wherein the periodic basis comprises at least one of the following: every fifth transaction session, every tenth transaction session, every transaction session, and every other transaction session.

18. The method of claim 17 wherein enrolling the ATM user in the incentive program comprises recording the BIN of the ATM user.

19. The method of claim 1 further comprising establishing the incentive program account for the ATM user.

20. The method of claim 19 further comprising assigning a pre-selected number of points to the incentive program account of the ATM user.

21. The method of claim 20 further comprising receiving a request to view the number of points in the incentive program account of the ATM user and displaying the number of points associated with the ATM user.

22. The method of claim 21 further comprising accessing the incentive program account of the ATM user, wherein the incentive program account comprises the number of points associated with the ATM user.

23. The method of claim 22 further comprising displaying an advertisement to the ATM user.

24. The method of claim 23 further comprising displaying an advertising-view inquiry comprising an invitation to view an advertisement in exchange for the addition of points to the incentive program account of the ATM user and receiving an affirmative response to the advertising-view inquiry.

25. The method of claim 24 further comprising receiving an indication from the ATM user that the ATM user viewed the advertisement; and, after receiving the indication from the ATM user that the ATM user viewed the advertisement, assigning a second pre-selected number of points to the incentive program account of the ATM user.

26. The method of claim 25 further comprising determining if the ATM user is eligible for an incentive award.

27. The method of claim 26 wherein determining if the ATM user is eligible for the incentive award comprises comparing the number of points associated with the ATM user with a third pre-selected number of points.

28. The method of claim 27 comprising providing the ATM user with the award.

29. The method of claim 28 wherein the award comprises forgiveness of the convenience fee.

30. The method of claim 28 further comprising recording an electronic transaction of the ATM user in a transaction database associated with the ATM user.

31. The method of claim 30 further comprising selecting the advertisement based on the transaction database associated with the ATM user.

32. The method of claim 31 wherein the ATM comprises an off-premises ATM.

33. The method of claim 1 wherein enrolling the ATM user in the incentive program comprises contacting the ATM user using data in the response.

34. The method of claim 33 wherein the ATM comprises an off-premises ATM.

35. A system for promoting banking services comprising:
    means for receiving at an automatic teller machine (ATM) a transaction request from an ATM user for a transaction for which a convenience fee is charged if the user is a non-customer, wherein the ATM comprises a display screen;
    means for determining that the ATM user comprises a non-customer;
    means for displaying information related to an incentive program for non-customers on the display screen, wherein the information prompts the ATM user for a response;
    means for receiving the response from the ATM user;
    means for enrolling the ATM user in the incentive program;
    means for accumulating award points in an incentive program account for the enrolled non-customer ATM user in connection with each succeeding transaction request from the enrolled non-customer ATM user; and
    means for discounting at least a portion of the convenience fee for the enrolled non-customer ATM user when a pre-determined award points balance is accumulated in the incentive program account.

36. The system of claim 35 further comprising means for tracking the electronic transactions of the ATM user.

37. The system of claim 36 wherein the ATM comprises an ATM operated by a first financial institution.

38. The system of claim 37 wherein the means for determining that the ATM user comprises a non-customer comprises means for determining that the ATM user is not a customer of the first financial institution.

39. The system of claim 38 wherein the means for determining that the ATM user comprises a non-customer comprises means for accessing a network associated with the first financial institution.

40. The system of claim 38 further comprising means for assigning a pre-selected number of points to the incentive program account of the ATM user in response to a pre-selected event.

41. The system of claim 40 further comprising means for receiving a point-balance request from the ATM user, means for accessing the account of the ATM user, wherein the account comprises a point balance of the ATM user, and means for providing the point balance of the ATM user to the ATM user.

42. The system of claim 41 wherein the transaction request comprises a bank identification number (BIN).

43. The system of claim 42 wherein the means for receiving at the automatic teller machine (ATM) the transaction request from the ATM user comprises means for receiving an ATM card of the ATM user.

44. The system of claim 43 wherein the information related to the incentive program for non-customers comprises information encouraging the ATM user to join the incentive program.

45. The system of claim 44 wherein the response comprises at least one of the following: an e-mail address and a telephone number.

46. The system of claim 44 further comprising means for tracking the ATM user's electronic transactions on a second ATM associated with the first financial institution.

47. The system of claim 46 further comprising means for providing the ATM user with further opportunities to earn a pre-selected number of points.

48. The system of claim 47 further comprising means for providing an opportunity to the ATM user to redeem the points for at least one of the following: goods, services, discounts, credit, and cash.

49. The system of claim 45 further comprising means for reducing the convenience fee of the ATM user.

50. The system of claim 35 wherein means for discounting the convenience fee of the ATM user is carried out on a periodic basis.

51. The system of claim 50 wherein the periodic basis comprises at least one of the following: every fifth transaction session, every tenth transaction session, every transaction session, and every other transaction session.

52. The system of claim 51 wherein means for enrolling the ATM user in the incentive program comprises means for recording the BIN of the ATM user.

53. The system of claim 35 further means for comprising establishing the incentive program account for the ATM user.

54. The system of claim 53 further comprising means for assigning a pre-selected number of points to the incentive program account of the ATM user.

55. The system of claim 54 further comprising means for receiving a request to view the number of points in the incentive program account of the ATM user and means for displaying the number of points associated with the ATM user.

56. The system of claim 55 further comprising means for accessing the incentive program account of the ATM user, wherein the incentive program account comprises the number of points associated with the ATM user.

57. The system of claim 56 further comprising means for displaying an advertisement to the ATM user.

58. The system of claim 57 further comprising means for displaying an advertising-view inquiry comprising an invitation to view an advertisement in exchange for the addition of points to the incentive program account of the ATM user and means for receiving an affirmative response to the advertising-view inquiry.

59. The system of claim 58 further comprising means for receiving an indication from the ATM user that the ATM user viewed the advertisement; and, means for assigning a second pre-selected number of points to the incentive program account of the ATM user after receiving the indication from the ATM user that the ATM user viewed the advertisement.

60. The system of claim 59 further comprising means for determining if the ATM user is eligible for an incentive award.

61. The system of claim 60 wherein means for determining if the ATM user is eligible for the incentive award comprises means for comparing the number of points associated with the ATM user with a third pre-selected number of points.

62. The system of claim 61 comprising means for providing the ATM user with the award.

63. The system of claim 62 wherein the award comprises forgiveness of the convenience fee.

64. The system of claim 62 further comprising means for recording an electronic transaction of the ATM user in a transaction database associated with the ATM user.

65. The system of claim 64 further comprising means for selecting the advertisement based on the transaction database associated with the ATM user.

66. The system of claim 65 wherein the ATM comprises an off-premises ATM.

67. The system of claim 35 wherein means for enrolling the ATM user in the incentive program comprises means for contacting the ATM user using data in the response.

68. The system of claim 67 wherein the ATM comprises an off-premises ATM.

\* \* \* \* \*

UNITED STATES PATENT AND TRADEMARK OFFICE
CERTIFICATE OF CORRECTION

| | | |
|---|---|---|
| PATENT NO. | : 7,421,410 B1 | |
| APPLICATION NO. | : 09/684096 | |
| DATED | : September 2, 2008 | |
| INVENTOR(S) | : Howard A. Schechtman and Peter Paradiso | |

It is certified that error appears in the above-identified patent and that said Letters Patent is hereby corrected as shown below:

On the Title page: Please add -

-- RELATED U.S. APPLICATION DATA

(60) Provisional application no. 60/158,113, filed on Oct. 7, 1999 --

IN THE REFERENCES CITED SECTION (56) - OTHER PUBLICATIONS -

On Page 2, Column 1, Line 3, please change "Anonymous, "New Tactics to Drice Up Debit Card Activity," Bank" to -- Anonymous, "New Tactics to Drive Up Debit Card Activity," Bank --

On Page 2, Column 1, Line 9, please change "ing Up to Four ATM Refnds Per Mounth to Customers in Effort to" to -- ing Up to Four ATM Refunds Per Month to Customers in Effort to --

On Page 2, Column 2, Line 1, please change "Gain More Clientele)," Financial Banker, vol. IV, No. 10, p. 5, Mar." to -- Gain More Clientele)," Financial NetNews, vol. IV, No. 10, p. 5, Mar. --

On Page 2, Column 2, Line 5, please change ""Sanwa Bank California Renews Commitment Not to Levy ATN" to -- "Sanwa Bank California Renews Commitment Not to Levy ATM --

Signed and Sealed this

Twenty-eighth Day of October, 2008

JON W. DUDAS
*Director of the United States Patent and Trademark Office*